(12) United States Patent
Nakahara et al.

(10) Patent No.: US 8,361,657 B2
(45) Date of Patent: Jan. 29, 2013

(54) TITANIUM OXIDE COMPOUND FOR USE IN ELECTRODE AND LITHIUM SECONDARY BATTERY COMPRISING THE SAME

(75) Inventors: Kiyoshi Nakahara, Ube (JP); Toshimasa Seki, Ube (JP); Nobuyuki Hashimoto, Ube (JP)

(73) Assignee: Titan Kogyo Kabushiki Kaisha, Ube-Shi, Yamaguchi-Ken (JP)

( * ) Notice: Subject to any disclaimer, the term of this patent is extended or adjusted under 35 U.S.C. 154(b) by 339 days.

(21) Appl. No.: 12/635,895

(22) Filed: Dec. 11, 2009

(65) Prior Publication Data
US 2010/0151327 A1 Jun. 17, 2010

(30) Foreign Application Priority Data
Dec. 15, 2008 (JP) .................. 2008/318538

(51) Int. Cl.
*H01M 4/48* (2010.01)
(52) U.S. Cl. ............ 429/231.5; 429/218.1; 423/598
(58) Field of Classification Search ............. 429/231.5; 423/598
See application file for complete search history.

(56) References Cited

FOREIGN PATENT DOCUMENTS

| | | |
|---|---|---|
| JP | 2007234233 | 9/2007 |
| JP | 2008117625 | 5/2008 |
| JP | 2008255000 | 10/2008 |
| WO | 2004059763 A2 | 7/2004 |

OTHER PUBLICATIONS

A. Robert Armstrong, Graham Armstrong, Jesus Canales, Raquel Garcia, and Peter G. Bruce, "Lithium-Ion Intercalation Into TIO2-B Nanowires", Advanced Materials, Apr. 4, 2005, pp. 862-865, 17, No. 7, Weinheim, DE.
Edisson Morgado Jr., Marco A.S. de Abreu, Gustavo T. Moure, Bojan A. Marinkovic, Paula M. Jardim and Antonio S. Araujo, Effects of Thermal Treatment of Nanostructured Trititanates on Their Crystallographic and Textural Properties, ScienceDirect, Materials Research Bulletin, 2007, pp. 1748-1760, vol. 42, Elsevier.
Huogen Yu, Jiaguo Yu and Bei Cheng, Photocatalytic Activity of the Calcined H-titanate Nanowires for Photocatalytic Oxidation of Acetone in Air, ScienceDirect, Chemosphere, 2007, pp. 2050-2057, vol. 66, Elsevier.
M. Tournoux, R. Marchand and L. Brohan, Layered K2Ti4O9 and the Open Metastable TiO2(B) Structure, Prog. Solid St. Chem, 1986, pp. 33-52, vol. 17, Pergamon Journals Ltd.

*Primary Examiner* — Patrick Ryan
*Assistant Examiner* — Ladan Mohaddes
(74) *Attorney, Agent, or Firm* — McNees Wallace & Nurick LLC

(57) ABSTRACT

For the purpose of increasing the electric capacity of lithium secondary batteries comprising titanium-based negative electrode materials, the present invention aims to produce a titanium oxide compound whose crystal structure, crystallite size, specific surface area and primary particle size are controlled, and to provide a lithium secondary battery comprising such a compound.
The present invention produces a lithium secondary battery by using, as an electrode active material, a titanium oxide compound for use in an electrode, which is represented by $TiO_2 \cdot (H_2O)a \cdot (A_2O)b$ (wherein A is Na or K, a is $0 < a = 1$, and b is $0 < b = 0.1$) and has a main peak at $2\theta = 20°$ to $30°$ and a minor peak at $2\theta = 45°$ to $55°$ in its X-ray diffraction pattern, wherein the crystallite size determined from the main peak ranges from 40 Å more to 500 Å or less.

8 Claims, 12 Drawing Sheets

US 8,361,657 B2

TITANIUM OXIDE COMPOUND FOR USE IN ELECTRODE AND LITHIUM SECONDARY BATTERY COMPRISING THE SAME

TECHNICAL FIELD

This application claims the benefits of Japanese Patent Application No. 2008-318538, filed on Dec. 15, 2008.

BACKGROUND ART

The present invention relates to a titanium oxide compound for use in an electrode, which is useful as an active material for lithium secondary batteries, and a lithium secondary battery comprising the same.

Lithium secondary batteries have improved as power sources for cellular phones and notebook computers because of their high energy density. With recent advances in IT technology which have required a reduction in the size and weight of portable remote terminals, batteries used as power sources for these terminals have also been required to have a smaller size and a higher capacity. Moreover, based on their high energy density, lithium secondary batteries have begun to receive attention as power sources for electric vehicles or hybrid vehicles and as power sources for power storage.

As to negative electrode materials for conventional lithium batteries, carbon-based negative electrodes are commonly used, and lithium secondary batteries comprising the same are characterized by providing high voltage during discharge and having high energy density. However, such negative electrodes have low electric potential and hence will induce an increased risk of internal short circuit caused by lithium metal deposited upon rapid charge and also a risk of ignition caused by the internal short circuit. For this reason, studies have been conducted to develop lithium batteries with high safety and long life, which are designed to have high potential negative electrodes to reduce heat generation upon internal short circuit although the energy density is lowered, and are further designed to suppress the decomposition of an electrolyte. Among them, $Li_4Ti_5O_{12}$ has an electric potential of 1.5 V on a lithium basis and is excellent in cycling characteristics because there is no volume change during charge and discharge. Thus, coin batteries comprising $Li_4Ti_5O_{12}$ have been developed for practical use.

However, $Li_4Ti_5O_{12}$ has a theoretical capacity of 175 mAh/g, which is as low as about a half of the electric capacity of carbon commonly used as a negative electrode material, and also has a drawback of reducing energy density when used in lithium secondary batteries. For this reason, there is a demand for a negative electrode material of high electric capacity having a voltage of 1.0 to 1.5 V vs. $Li/Li^+$ in terms of safety and long life.

Under these circumstances, Patent Document 1 shows $A_2Ti_3O_7$ (wherein A is one or two members selected from Na, Li and H) having the same crystal structure as that of $Na_2Ti_3O_7$, while Patent Document 2 shows that titanate bronze-type titanium dioxide having an isotropic shape of micron size is useful as an electrode material. However, the discharge capacity shown in these documents is less than 180 mAh/g, which essentially does not greatly exceed the electric capacity of titanium-based negative electrodes conventionally known. Moreover, Patent Document 3 shows that tunnel-structured titanium oxide having a specific crystal structure ($H_2Ti_{12}O_{25}$) achieves a discharge capacity of around 220 mAh/g. However, there is no information about particle size, and the effect of particle size is not clarified in this document. In other crystal structures, the effect of particle size is also not clarified.

The electric capacity of a lithium secondary battery is determined by the size of the particle surface through which lithium ions can enter or exit, the mobility of lithium ions across particles, and the number of sites at which lithium ions are held. The number of sites is determined by the crystal structure. For effective use of these sites, it is necessary to increase the specific surface area of particles through which lithium ions enter or exit the particles and to reduce the distance required for lithium ions to move into the particles. Thus, crystallite size is effective as a parameter representing the size of primary particles, i.e., migration length.

Patent Document 1: Japanese Patent Public Disclosure No. 2007-234233
Patent Document 2: Japanese Patent Public Disclosure No. 2008-117625
Patent Document 3: Japanese Patent Public Disclosure No. 2008-255000

DISCLOSURE OF THE INVENTION

Problems To Be Solved By the Invention

As described above, the electric capacity of conventional lithium secondary batteries remains insufficient, and there has been a demand for a negative electrode material of high electric capacity whose crystal structure, crystallite size, specific surface area and primary particle size are controlled.

Thus, for the purpose of increasing the electric capacity of lithium secondary batteries comprising titanium-based negative electrode materials, the present invention aims to produce a titanium oxide compound whose crystal structure, crystallite size, specific surface area and primary particle size are controlled, and to provide a lithium secondary battery comprising such a titanium oxide compound.

EXPLANATION OF THE REFERENCE NUMERALS

Figure 1:
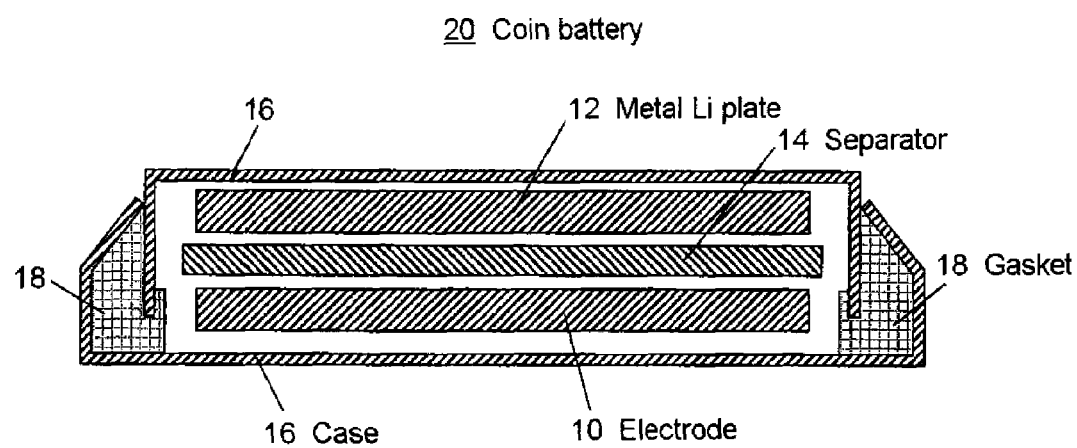
FIG. 1 is a schematic view of a coin battery used for battery evaluation.

10 Electrode (sample)
12 Metal Li plate
14 Separator

16 Case
18 Gasket
20 Coin battery

Means for Solving the Problems

As a result of extensive and intensive efforts made to achieve the above aim, the inventors of the present invention have obtained a titanium oxide compound which has a specific range of crystal structure and whose crystallite size is controlled in a range from 40 Å more to 500 Å or less. The inventors have also found that a lithium secondary battery prepared using this compound as a battery electrode is highly safe and shows high charge/discharge capacity. This finding led to the completion of the present invention.

Namely, the titanium oxide compound of the present invention for use in an electrode is a titanium oxide compound serving as an electrode active material, being represented by $TiO_2 \cdot (H_2O)a \cdot (A_2O)b$ (wherein A is Na or K, a is 0<a=1, and b is 0<b=0.1) and having a main peak at $2\theta=20°$ to $30°$ and a minor peak at $2\theta=45°$ to $55°$ in its X-ray diffraction pattern, wherein the crystallite size determined from the main peak ranges from 40 Å more to 500 Å or less.

The above titanium oxide compound preferably has a specific surface area of 20 $m^2/g$ or more to 400 $m^2/g$ or less. Likewise, the titanium oxide compound preferably has a primary particle size of 0.01 to 0.5 μm.

Moreover, when the above titanium oxide compound is used to prepare a lithium secondary battery with a counter electrode made of metal Li, it is possible to provide a discharge capacity of 200 mAh/g or more in the third cycle of charge/discharge test performed at 35 mA per g of active material.

Further, the above titanium oxide compound for use in an electrode may be used as a positive or negative electrode active material to give a battery electrode.

Furthermore, the above battery electrode may be used to form a lithium secondary battery.

Advantages of the Invention

The titanium oxide compound of the present invention for use in an electrode allows an increase in the charge/discharge capacity as a result of its controlled crystallite size, specific surface area, primary particle size, and Na or K content, and also allows an increase in the energy density when used as a negative electrode in a lithium battery.

BEST MODE FOR CARRYING OUT THE INVENTION

The titanium oxide compound of the present invention for use in an electrode will be further described in more detail below.

The titanium oxide compound of the present invention for use in an electrode is a titanium oxide compound represented by $TiO_2 \cdot (H_2O)a \cdot (A_2O)b$ (wherein A is Na or K, a is 0<a=1, and b is 0<b=0.1) and has a main peak at $2\theta=20°$ to $30°$ and a minor peak at $2\theta=45°$ to $55°$ in its X-ray diffraction pattern, wherein the crystallite size determined from the main peak ranges from 40 Å or more to 500 Å or less.

(Crystal Structure)

A titanium oxide compound synthesized via sodium titanate or potassium titanate as an intermediate is predicted to have a layer structure or a tunnel structure, although its precise crystal structure is difficult to identify due to the low intensity of its X-ray diffraction peaks. In contrast, in the case of a titanium oxide compound, such as spinel-type lithium titanate, which has no main peak at 20° to 30°, it is not possible to achieve a charge/discharge capacity of 200 mAh/g or more even when the crystallite size and/or specific surface area is controlled.

(Starting Material)

As a starting material, titanium oxide or a titanium oxide compound may be used, including anatase- or rutile-type titanium oxide, hydrous titanium oxide, titanium hydroxide, etc. For control of the crystallite size and/or specific surface area, hydrous titanium oxide (metatitanic acid) or titanium hydroxide (orthotitanic acid) is preferred for use as a starting material because it is in the form of fine particles and is highly reactive. Hydrous titanium oxide or titanium hydroxide, which is in the form of fine particles and is highly reactive, can be obtained by hydrolysis of a titanium compound including titanyl sulfate, titanium tetrachloride, titanium alkoxide, etc. When hydrous titanium oxide or titanium hydroxide is used as a starting material, there is a possibility that the final product will contain residual crystal water. In terms of achieving an increased electric capacity, less crystal water is more desirable because such crystal water is an impurity. However, it is not preferable to remove crystal water by excessive heat treatment because such treatment will cause a change in the crystal structure. Residual crystal water within an acceptable range will produce little adverse effect. The amount of crystal water can be determined from the weight loss observed upon heat treatment at 900° C. for 2 hours.

(Composition of Titanium Oxide Compound)

Since residual sodium or potassium originating from sodium titanate or potassium titanate, which is an intermediate product during layer or tunnel structure production, serves as an impurity and induces a reduction in the charge/discharge capacity, it is desirable to minimize such residual sodium or potassium. However, if there remains too little sodium or potassium, it is more likely to cause conversion into anatase- or rutile-type titanium oxide upon heating. For this reason, to achieve a discharge capacity of at least 200 mAh/g or more, the intended titanium oxide compound should be represented by $TiO_2 \cdot (H_2O)a \cdot (A_2O)b$ (wherein A is Na or K) and is also required to satisfy 0<a=1 (for the above reason) and 0<b=0.1, more preferably 0<a=0.8 and 0.01=b=0.06. It should be noted that the sodium or potassium content may be determined by X-ray fluorescence analysis.

(Crystallite Size)

Crystallite size is a parameter representing the size of unit crystal, which represents the diffusion distance of lithium ions entering upon electrode reaction in particles or the migration length required for the entering lithium ions to reach and exit from the particle surface. If this parameter is too large, the migration length of lithium ions into the particles is increased to thereby cause a reduction in the charge/discharge capacity. Since layer- and tunnel-structured titanium oxide compounds have in common peaks at $2\theta=20°$ to $30°$ and $45°$ to $55°$ in their X-ray diffraction patterns, fullwidth at half maximum of the peak at $20°$ to $30°$ may be used to determine the crystallite size by the Scherrer equation: $D=K\lambda/(\beta \cos \theta)$ (D: crystallite size (Å), K: a constant of 0.9, λ: X-ray wavelength (1.54 Å), β: half-value width of diffraction peak (rad), θ: diffraction angle (°)). If the thus determined value is in a range from 40 Å or more to 500 Å or less, a charge/discharge capacity of 200 mAh/g or more can be achieved.

(Specific Surface Area)

Specific surface area, which is measured by the BET method, is a parameter representing the size of reaction interface in the titanium oxide compound when electrode reaction occurs with entry and exit of lithium ions. This parameter is an important factor for rapid charge and discharge. Namely, a larger value of this parameter results in a higher reactivity. However, too large a value causes an increase in the internal resistance of a battery due to reduced adhesion with an electrode current collector and increased interface resistance between particles. On the other hand, too small a value results in a reduced reactivity. Thus, sufficient load characteristics cannot be obtained at either too large or too small a value. For this reason, the specific surface area is preferably controlled in a range from 20 m$^2$/g or more to 400 m$^2$/g or less.

(Primary Particle Size)

Primary particle size, which is observed with a transmission electron microscope, is a parameter that is observed more directly than the crystallite size or specific surface area. When the crystallite size and specific surface area are controlled in the above ranges and further the primary particle size is set to 0.01 to 0.5 μm, it is possible to obtain an active material having a good balance between electric capacity and cycling characteristics.

(Sodium Titanate or Potassium Titanate Intermediate)

To synthesize layer- or tunnel-structured microparticulate titanium oxide compounds, sodium titanate or potassium titanate may be used as an intermediate for their synthesis. In a case where anatase-type titanium oxide of the order of submicrons, which is commonly used as a pigment, is mixed with sodium carbonate or potassium carbonate and reacted by the calcination method to give sodium titanate or potassium titanate for use as a precursor, the resulting precursor may be ground into fine particles but much energy is required for grinding. It is therefore more desirable to prepare an intermediate of the order of nanometers by wet synthesis. In this case, the titanium oxide starting material preferred for use is fine particles of hydrous titanium oxide. A technique in which sodium titanate or potassium titanate is synthesized as an intermediate by the wet method is less likely to cause particle growth and is eventually useful in obtaining a titanium oxide compound whose crystallite size and specific surface area are controlled. Moreover, impurities, i.e., sodium and potassium should be removed to ensure high discharge capacity, and removal by acid treatment is easier to perform in the case of wet synthesis than in synthesis by the calcination method, which makes it possible to control the amount of residual sodium and potassium.

(Titanium Oxide Compound)

After acid treatment to effect replacement with protons, heat treatment may be performed at a temperature as high as possible below 500° C. within a range not causing conversion into anatase-type titanium oxide to thereby synthesize a layer- or tunnel-structured titanium oxide compound having a crystallite size of 40 Å or more to 500 Å or less and a specific surface area of 20 m$^2$/g or more to 400 m$^2$/g or less. When the titanium oxide compound thus synthesized is used to prepare an electrode for a coin-type secondary battery with a counter electrode made of metal Li, which is subjected to a charge/discharge test, the titanium oxide compound of the present invention achieves a discharge capacity as high as 200 mAh/g or more in the third cycle of the charge/discharge test performed at 35 mA per g of active material. Moreover, the ratio of discharge capacity in the third cycle relative to the first cycle can also be maintained at as high as 70% or more.

(Synthesis Procedures)

Detailed synthesis procedures for obtaining layer- or tunnel-structured titanium oxide compounds will be described here. Sodium titanate or potassium titanate may be obtained as follows: to a slurry of hydrous titanium oxide dispersed in water, sodium hydroxide or potassium hydroxide is added at a Na/Ti or K/Ti molar ratio ranging from 1.0 to 10.0 and then reacted at a temperature of 90° C. or higher.

The resulting reaction product is filtered, washed and then dispersed again into a slurry form, followed by maintaining the pH at 1 to 3 with an acid to replace all or part of sodium or potassium ions by protons. Any commonly used acid may be used for this purpose, including sulfuric acid, hydrochloric acid, nitric acid, etc. After acid treatment, the resulting mixture is filtered, washed and dried, followed by heat treatment at a temperature of 700° C. or lower. During this heat treatment, too high a temperature causes conversion into anatase-type titanium oxide, while too low a temperature is responsible for reduced electric capacity and reduced cycling characteristics in the final battery. For this reason, the optimum temperature is as high as possible within a range not causing conversion into anatase-type titanium oxide, and more preferably ranges from 200° C. to 500° C.

(Characteristics)

When the titanium oxide compound synthesized as described above is used as an active material to prepare an electrode for a coin-type secondary battery with a counter electrode made of metal Li, which is subjected to a charge/discharge test at 35 mA per g of active material, the titanium oxide compound of the present invention achieves a discharge capacity as high as 200 mAh/g or more, and the ratio of discharge capacity in the third cycle relative to the first cycle can also be maintained at as high as 70% or more.

EXAMPLES

The present invention will be further described in more detail by way of the following examples, which are provided for illustrative purposes only and are not intended to limit the scope of the invention.

Example 1

After microparticulate hydrous titanium oxide obtained by hydrolysis of titanyl sulfate was dispersed in water to give a slurry, aqueous sodium hydroxide was added at a Na/Ti molar ratio of 2.0 and reacted at 90° C. for 24 hours. The reacted product was filtered, washed, adjusted to pH 2 with sulfuric acid and maintained for 24 hours. The product was then filtered, washed and heat-treated at 250° C. for 2 hours to obtain Sample 1. Sample 1 thus obtained was measured for its specific surface area by the BET single-point method with a Micromeritics Gemini 2375. To determine the crystallite size, a diffraction pattern was measured with a TTRIII (Rigaku Corporation, Japan) using a Cu target over a 2θ range of 20° to 30°, followed by calculation according to the Scherrer method. The battery characteristics were measured by the following procedures. This sample (82 parts by weight), acetylene black (9 parts by weight) and polyvinylidene fluoride (9 parts by weight) were mixed and then kneaded into N-methyl-2-pyrrolidone at a solid concentration of 30% in a high-shear mixer for 5 minutes to prepare a coating mixture. Subsequently, the above coating mixture was applied onto aluminum foil by the doctor blade method. After drying in vacuo at 110° C., this electrode composite was roll-pressed into 80% of its initial thickness. A section punched out in an area of 1 cm$^2$ was placed as an electrode (10) in a coin battery as shown in FIG. 1. In FIG. 1, the counter electrode used was a metal Li plate (12), the electrolyte used was an equal volume mixture of ethylene carbonate and dimethyl carbonate, which contains 1 mol/L LiPF$_6$ dissolved therein, and the separator (14) used was a glass filter. These elements were covered with a case (16) and a gasket (18) to prepare a coin battery (20).

The coin battery thus prepared was discharged to 1.0 V at 35 mA per g of active material and then charged to 3.0 V at the same electric current level. This cycle was repeated three times. In addition, the sample was measured for its water content from the weight loss upon heating at 900° C. for 2 hours and also measured for its Na content with a Simultix X-ray fluorescence analyzer (Rigaku Corporation, Japan) to determine the a and b values. The results obtained are shown in Table 1.

sample. The discharge capacity was 195 mAh/g in the first cycle and 152 mAh/g in the third cycle.

Example 3

The same procedure as shown in Example 1 was repeated to obtain Sample 4, except that the heat treatment was performed at 400° C. The results obtained are shown in Table 1. The X-ray diffraction pattern obtained is shown in FIG. 2.

TABLE 1

|  | Sample No. | Crystallite size Å | Specific surface area m²/g | $TiO_2(H_2O)a(Na_2O)b$ or $TiO_2(H_2O)a(K_2O)b$ | | Discharge capacity | | Capacity retention % |
| --- | --- | --- | --- | --- | --- | --- | --- | --- |
|  |  |  |  | a | b | 1 cycle mAh/g | 3 cycle mAh/g |  |
| Example 1 | Sample 1 | 70 | 350 | 0.74 | 0.01 | 350 | 250 | 71.4 |
| Example 2 | Sample 2 | 68 | 345 | 0.74 | 0.06 | 280 | 200 | 71.4 |
| Comparative Example 1 | Sample 3 | 67 | 343 | 0.74 | 0.14 | 195 | 152 | 77.9 |
| Example 3 | Sample 4 | 111 | 159 | 0.44 | 0.01 | 270 | 226 | 83.7 |
| Example 4 | Sample 5 | 230 | 21 | 0.24 | 0.01 | 241 | 200 | 83.0 |
| Comparative Example 2 | Sample 6 | 512 | 10 | 0.05 | 0.01 | 125 | 113 | 90.4 |
| Example 5 | Sample 7 | 41 | 320 | 0.63 | 0.02 | 261 | 222 | 85.1 |
| Comparative Example 3 | Sample 8 | 505 | 11 | 0.05 | 0.02 | 232 | 171 | 73.7 |

Figure 2:
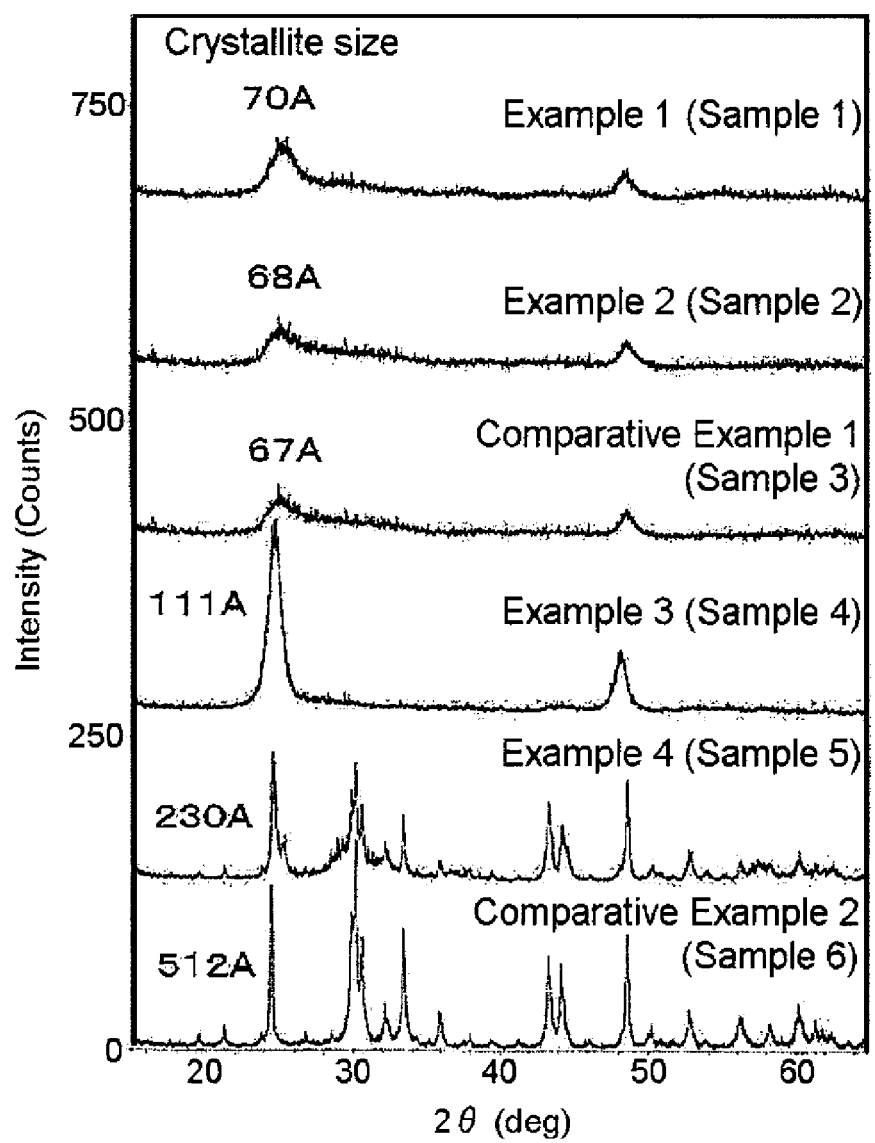
FIG. 2 shows X-ray diffraction patterns of samples prepared via sodium titanate as an intermediate.
Figure 4:
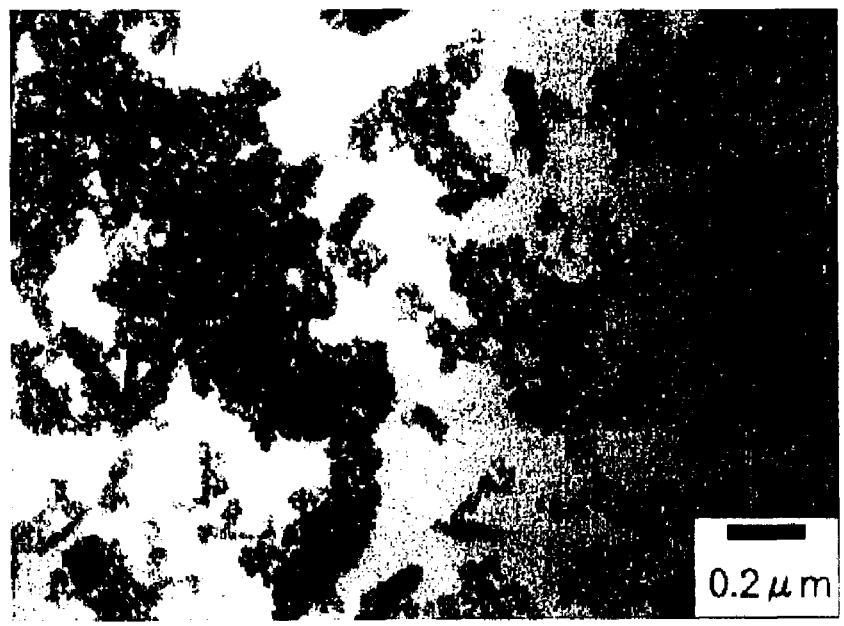
FIG. 4 shows a transmission electron microscope photograph of Example 1.
Figure 5:
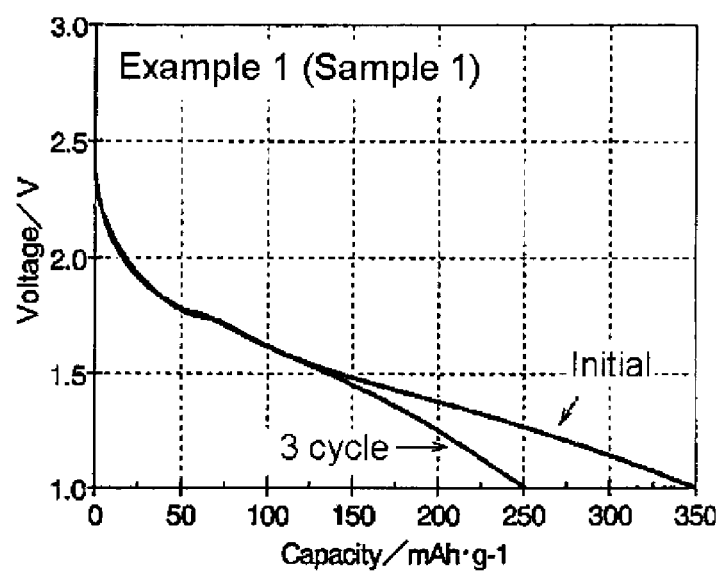
FIG. 5 shows the discharge curve of Example 1 (Sample 1).

The X-ray diffraction pattern obtained is shown in FIG. 2. Sample 1 was found to have a crystallite size of 70 Å and a specific surface area of 350 m²/g. Sample 1 was also found to have a water content of 14.2 wt % and a $Na_2O$ content of 0.7 wt %, indicating that a and b in $TiO_2.(H_2O)a.(Na_2O)b$ were 0.74 and 0.01, respectively. This sample was also confirmed for its primary particle size with a transmission electron microscope (JEOL Ltd., Japan). FIG. 4 shows an electron microscope photograph of this sample. Based on this photograph, the primary particle size was confirmed to be less than 0.5 μm. FIG. 5 shows the discharge curve of this sample. The discharge capacity was 350 mAh/g in the first cycle and 250 mAh/g in the third cycle, thus confirming that this sample ensures a high capacity of 200 mAh/g or more.

Example 2

Figure 6:
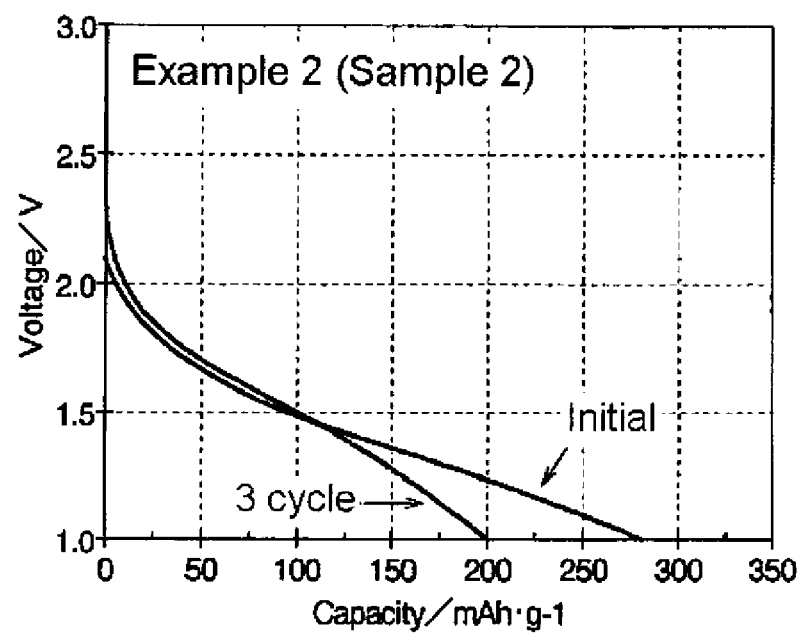
FIG. 6 shows the discharge curve of Example 2 (Sample 2).

The same procedure as shown in Example 1 was repeated to obtain Sample 2, except that the pH was adjusted to 4 with sulfuric acid. The results obtained are shown in Table 1. The X-ray diffraction pattern obtained is shown in FIG. 2. Sample 2 was found to have a crystallite size of 68 Å and a specific surface area of 345 m²/g. Sample 2 was also found to have a water content of 13.8 wt % and a $Na_2O$ content of 3.57 wt %, indicating that a and b in $TiO_2.(H_2O)a.(Na_2O)b$ were 0.74 and 0.06, respectively. FIG. 6 shows the discharge curve of this sample. The discharge capacity was 280 mAh/g in the first cycle and 200 mAh/g in the third cycle, thus confirming that this sample ensures a high capacity of 200 mAh/g or more.

Comparative Example 1

Figure 7:
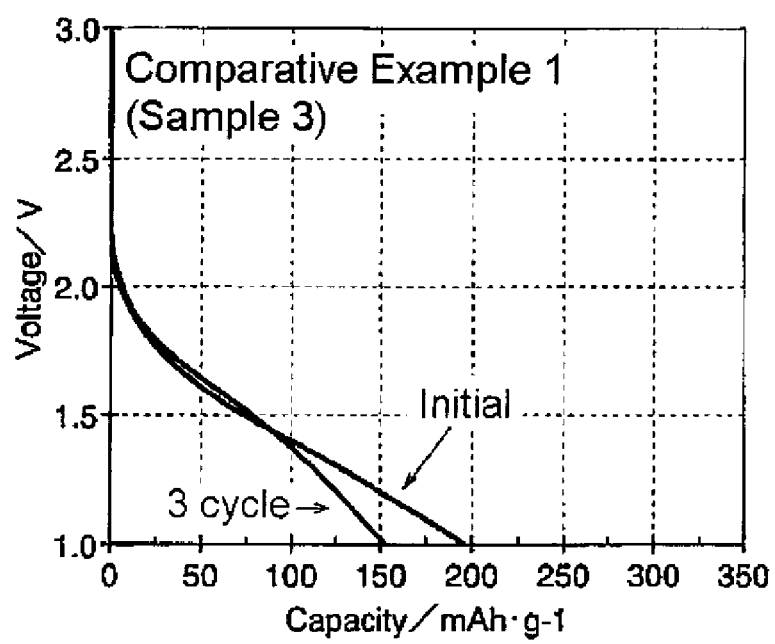
FIG. 7 shows the discharge curve of Comparative Example 1 (Sample 3).
Figure 8:
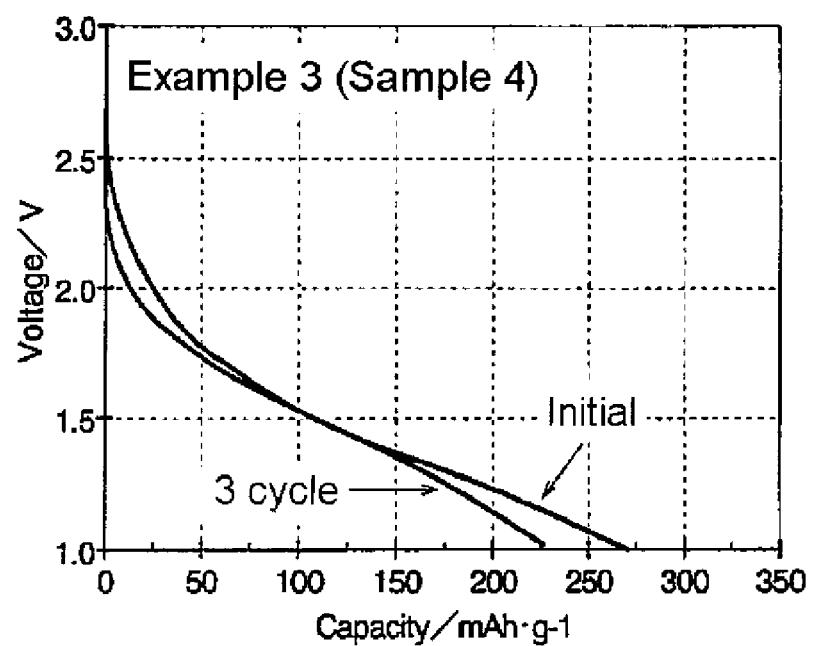
FIG. 8 shows the discharge curve of Example 3 (Sample 4).

The same procedure as shown in Example 1 was repeated to obtain Sample 3, except that the pH was adjusted to 7 with sulfuric acid. The results obtained are shown in Table 1. The X-ray diffraction pattern obtained is shown in FIG. 2. Sample 3 was found to have a crystallite size of 67 Å and a specific surface area of 343 m²/g. Sample 3 was also found to have a water content of 13.1 wt % and a $Na_2O$ content of 8.50 wt %, indicating that a and b in $TiO_2.(H_2O)a.(Na_2O)b$ were 0.74 and 0.14, respectively. FIG. 7 shows the discharge curve of this Sample 4 was found to have a crystallite size of 111 Å and a specific surface area of 159 m²/g. Sample 4 was also found to have a water content of 8.9 wt % and a $Na_2O$ content of 0.74 wt %, indicating that a and b in $TiO_2.(H_2O)a.(Na_2O)b$ were 0.44 and 0.01, respectively. FIG. 8 shows the discharge curve of this sample. The discharge capacity was 270 mAh/g in the first cycle and 226 mAh/g in the third cycle, thus confirming that this sample ensures a high capacity of 200 mAh/g or more.

Example 4

Figure 9:
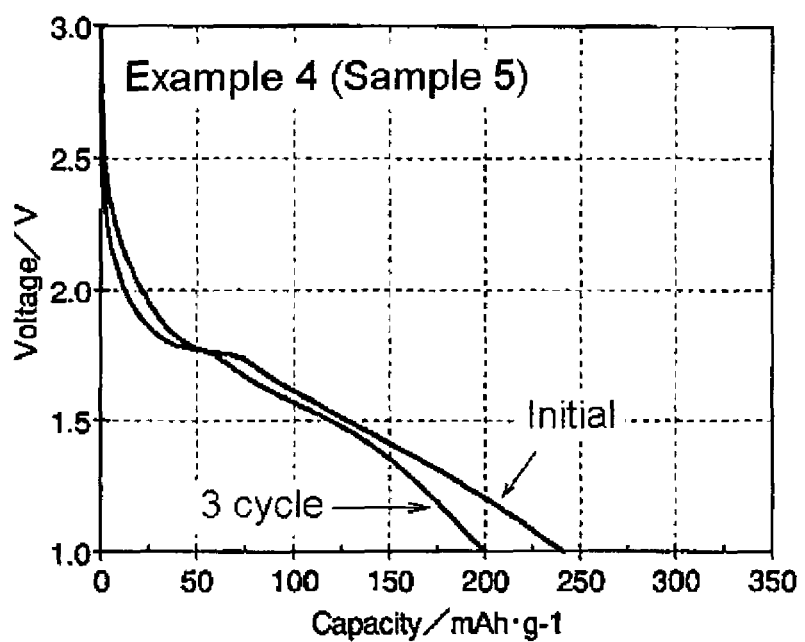
FIG. 9 shows the discharge curve of Example 4 (Sample 5).

The same procedure as shown in Example 1 was repeated to obtain Sample 5, except that the heat treatment was performed at 600° C. The results obtained are shown in Table 1. The X-ray diffraction pattern obtained is shown in FIG. 2. Sample 5 was found to have a crystallite size of 230 Å and a specific surface area of 21 m²/g. Sample 5 was also found to have a water content of 5.0 wt % and a $Na_2O$ content of 0.78 wt %, indicating that a and b in $TiO_2.(H_2O)a.(Na_2O)b$ were 0.24 and 0.01, respectively. FIG. 9 shows the discharge curve of this sample. The discharge capacity was 241 mAh/g in the first cycle and 200 mAh/g in the third cycle, thus confirming that this sample ensures a high capacity of 200 mAh/g or more.

Comparative Example 2

Figure 10:
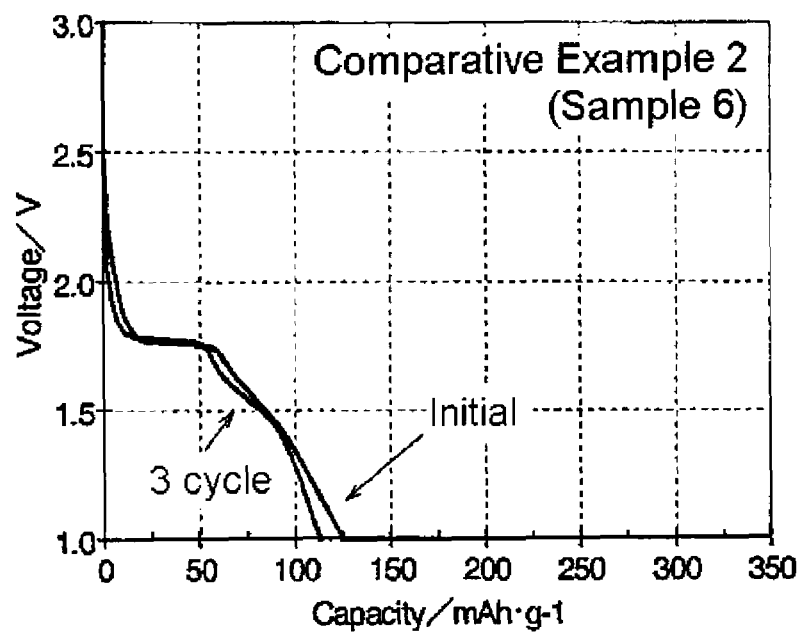
FIG. 10 shows the discharge curve of Comparative Example 2 (Sample 6).

The same procedure as shown in Example 1 was repeated to obtain Sample 6, except that the heat treatment was performed at 900° C. The results obtained are shown in Table 1. The X-ray diffraction pattern obtained is shown in FIG. 2. Sample 6 was found to have a crystallite size of 512 Å and a specific surface area of 10 m²/g. Sample 6 was also found to have a water content of 1.0 wt % and a $Na_2O$ content of 0.81 wt %, indicating that a and b in $TiO_2.(H_2O)a.(Na_2O)b$ were 0.05 and 0.01, respectively. FIG. 10 shows the discharge curve of this sample. The discharge capacity was 125 mAh/g in the first cycle and 113 mAh/g in the third cycle.

Example 5

Figure 3:
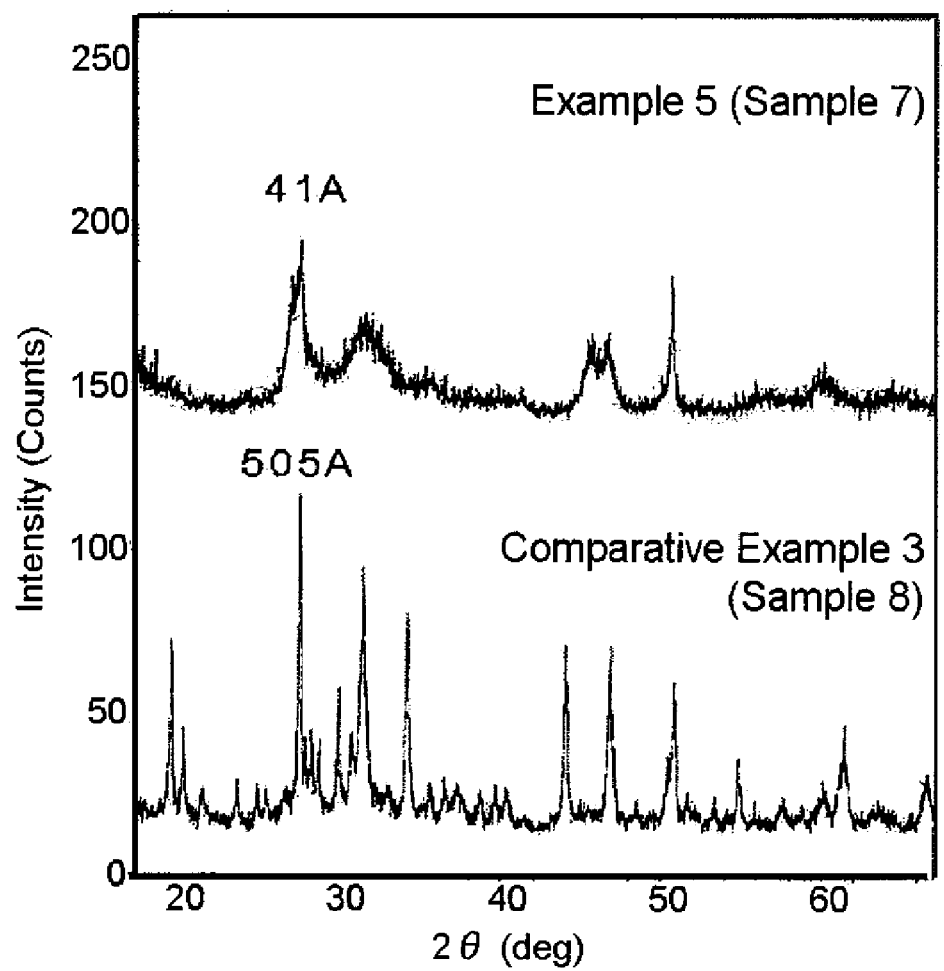
FIG. 3 shows X-ray diffraction patterns of samples prepared via potassium titanate as an intermediate.
Figure 11:
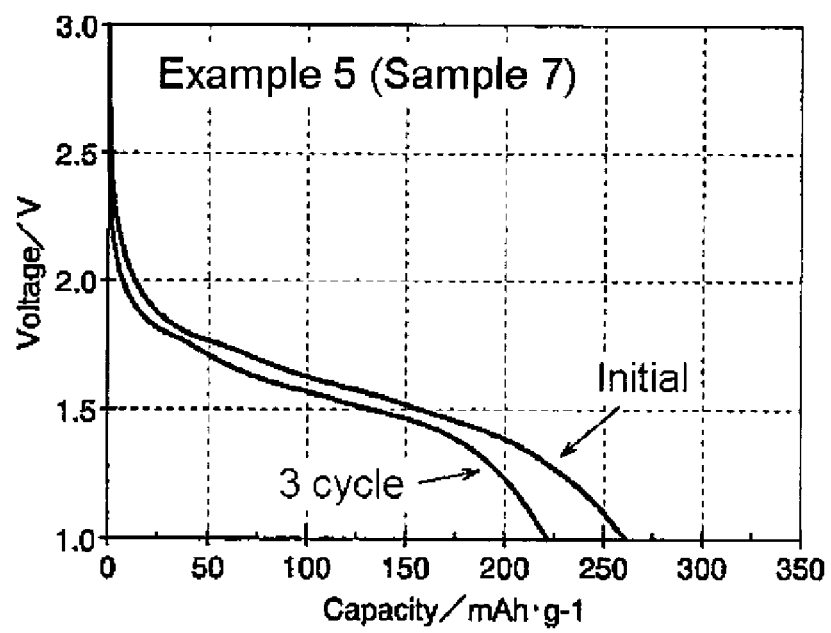
FIG. 11 shows the discharge curve of Example 5 (Sample 7).

The same procedure as shown in Example 1 was repeated to obtain Sample 7, except that the addition of aqueous sodium hydroxide at a Na/Ti molar ratio of 2.0 was replaced by addition of aqueous potassium hydroxide at a K/Ti molar ratio of 2.0. The results obtained are shown in Table 1. The X-ray diffraction pattern obtained is shown in FIG. 3. Sample 7 was found to have a crystallite size of 41 Å and a specific surface area of 320 m$^2$/g. Sample 7 was also found to have a water content of 12.2 wt % and a $K_2O$ content of 2.4 wt %, indicating that a and b in $TiO_2 \cdot (H_2O)a \cdot (K_2O)b$ were 0.63 and 0.02, respectively. FIG. 11 shows the discharge curve of this sample. The discharge capacity was 261 mAh/g in the first cycle and 222 mAh/g in the third cycle, thus confirming that this sample ensures a high capacity of 200 mAh/g or more.

Comparative Example 3

Figure 12:
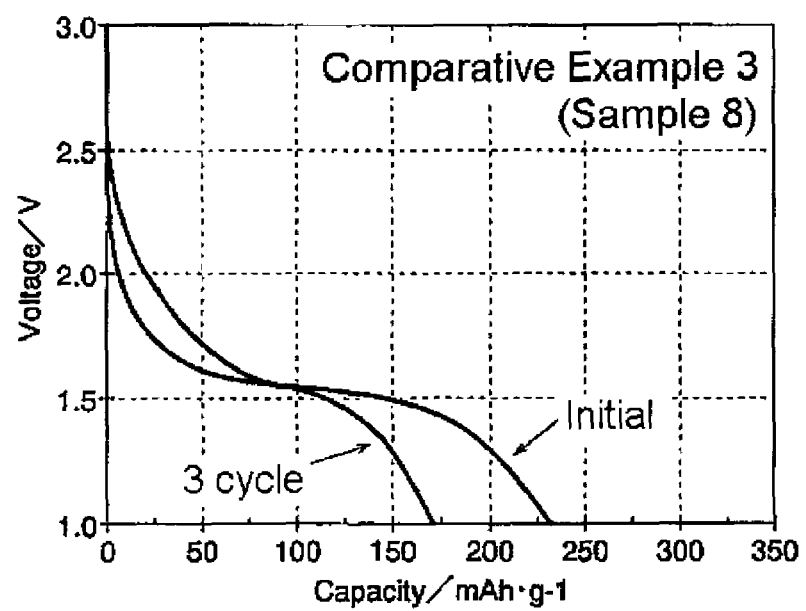
FIG. 12 shows the discharge curve of Comparative Example 3 (Sample 8).

The same procedure as shown in Example 5 was repeated to obtain Sample 8, except that the heat treatment was performed at 900° C. The results obtained are shown in Table 1. The X-ray diffraction pattern obtained is shown in FIG. 3. Sample 8 was found to have a crystallite size of 505 Å and a specific surface area of 11 m$^2$/g. Sample 8 was also found to have a water content of 1.0 wt % and a $K_2O$ content of 2.1 wt %, indicating that a and b in $TiO_2 \cdot (H_2O)a \cdot (K_2O)b$ were 0.05 and 0.02, respectively. FIG. 12 shows the discharge curve of this sample. The discharge capacity was 232 mAh/g in the first cycle and 171 mAh/g in the third cycle.

What is claimed is:

1. A titanium oxide compound for use in an electrode, which is an electrode active material, has the formula $TiO_2 \cdot (H_2O)a \cdot (A_2O)b$, wherein A is Na or K, a is $0.05 \leq a \leq 1$, and b is $0.01 \leq b \leq 0.1$, and has a main peak at $2\theta=20°$ to $30°$ and a minor peak at $2\theta=45°$ to $55°$ in its X-ray diffraction pattern using a Cu target λ: X-ray wavelength (1.54 Å), wherein the titanium oxide compound is in the form of fine particles, and, has a crystallite size determined from the main peak between 40 Å to 500 Å.

2. The titanium oxide compound for use in an electrode according to claim 1, wherein the titanium oxide compound has a specific surface area of 20 m$^2$/g or more to 400 m$^2$/g or less.

3. The titanium oxide compound for use in an electrode according to claim 1, wherein when used to prepare a lithium secondary battery with a counter electrode made of metal Li, the titanium oxide compound provides a discharge capacity of 200 mAh/g or more in the third cycle of charge/discharge test performed at 35 mA per g of active material.

4. A battery electrode, which comprises the titanium oxide compound for use in an electrode according to claim 1 as a positive or negative electrode active material.

5. A lithium secondary battery, which comprises the battery electrode according to claim 4.

6. The titanium oxide compound for use in an electrode according to claim 2, wherein when used to prepare a lithium secondary battery with a counter electrode made of metal Li, the titanium oxide compound provides a discharge capacity of 200 mAh/g or more in the third cycle of charge/discharge test performed at 35 mA per g of active material.

7. A battery electrode, which comprises the titanium oxide compound for use in an electrode according to claim 2 as a positive or negative electrode active material.

8. A lithium secondary battery, which comprises the battery electrode according to claim 7.

* * * * *